United States Patent
Balbi et al.

(10) Patent No.: US 12,436,752 B2
(45) Date of Patent: Oct. 7, 2025

(54) SYSTEM AND METHOD FOR DEVELOPMENT OF GATEWAY POLICIES IN AN APPLICATION PROGRAMMING INTERFACE ENVIRONMENT

(71) Applicant: Salesforce, Inc., San Francisco, CA (US)

(72) Inventors: Federico Balbi, Buenos Aires (AR); Mariano De Sousa Bispo, Buenos Aires (AR); Dario Carabajal, Buenos Aires (AR); Pablo Nicolas Gomez, Buenos Aires (AR); Andres Testi, Buenos Aires (AR); Javier Atadia, Buenos Aires (AR)

(73) Assignee: Salesforce, Inc., San Francisco, CA (US)

( * ) Notice: Subject to any disclaimer, the term of this patent is extended or adjusted under 35 U.S.C. 154(b) by 219 days.

(21) Appl. No.: 17/948,799

(22) Filed: Sep. 20, 2022

(65) Prior Publication Data
US 2023/0092752 A1    Mar. 23, 2023

Related U.S. Application Data

(60) Provisional application No. 63/246,137, filed on Sep. 20, 2021.

(51) Int. Cl.
*G06F 8/65* (2018.01)
*G06F 8/10* (2018.01)
(Continued)

(52) U.S. Cl.
CPC .................. *G06F 8/65* (2013.01); *G06F 8/10* (2013.01); *G06F 8/36* (2013.01); *G06F 8/423* (2013.01);
(Continued)

(58) Field of Classification Search
None
See application file for complete search history.

(56) References Cited

U.S. PATENT DOCUMENTS

| | | | |
|---|---|---|---|
| 7,461,086 B1 * | 12/2008 | Hurren | G06F 9/44552 707/999.102 |
| 7,945,897 B1 * | 5/2011 | Cook | G06F 9/445 717/121 |

(Continued)

FOREIGN PATENT DOCUMENTS

| | | | | |
|---|---|---|---|---|
| CN | 113239373 A | * | 8/2021 | |
| WO | WO-2022062647 A1 | * | 3/2022 | G06F 8/41 |

*Primary Examiner* — Philip Wang
(74) *Attorney, Agent, or Firm* — Sterne, Kessler, Goldstein &Fox P.L.L.C.

(57) ABSTRACT

Disclosed herein are system, method, and computer program product embodiments for providing a streamlines API development environment. In the environment, pre-coded code modules corresponding to common policy functions are stored in memory and can be used, copied, and/or incorporated into developer custom policies. Function calls and/or references to specific code modules can be incorporated into developer custom policies, which will invoke one of the stored code modules. Additionally, one or more compilers are provided to compile code from a development language to a predetermined production language. Although the development language is preset by the development environment, other languages can be supported by downloading compilers for preferred development languages.

20 Claims, 7 Drawing Sheets

(51) Int. Cl.

| | | |
|---|---|---|
| *G06F 8/36* | (2018.01) | |
| *G06F 8/41* | (2018.01) | |
| *G06F 8/71* | (2018.01) | |
| *G06F 9/54* | (2006.01) | |
| *G06F 21/62* | (2013.01) | |
| *H04L 9/40* | (2022.01) | |
| *H04L 47/22* | (2022.01) | |

(52) U.S. Cl.
CPC ........... *G06F 8/457* (2013.01); *G06F 8/71* (2013.01); *G06F 9/541* (2013.01); *G06F 9/547* (2013.01); *G06F 21/6218* (2013.01); *H04L 47/22* (2013.01); *H04L 63/029* (2013.01); *H04L 63/1458* (2013.01); *H04L 63/20* (2013.01)

(56) References Cited

U.S. PATENT DOCUMENTS

| | | | | |
|---|---|---|---|---|
| 8,910,115 | B2* | 12/2014 | Reddy | G06F 8/41 |
| | | | | 717/137 |
| 10,628,286 | B1* | 4/2020 | Iyer | G06F 8/33 |
| 10,671,510 | B1* | 6/2020 | Willson | G06F 11/3676 |
| 10,929,211 | B1* | 2/2021 | Mylavarapu | G06F 11/3466 |
| 11,088,914 | B2* | 8/2021 | Boddam | H04L 41/5019 |
| 11,170,099 | B1* | 11/2021 | Sandall | G06F 9/547 |
| 11,301,357 | B1* | 4/2022 | Gacek | G06F 11/323 |
| 2005/0044075 | A1* | 2/2005 | Steere | G06F 16/10 |
| 2007/0168496 | A1* | 7/2007 | Bansod | G06F 11/008 |
| | | | | 709/224 |
| 2007/0250825 | A1* | 10/2007 | Hicks | G06F 8/443 |
| | | | | 717/151 |
| 2011/0282921 | A1* | 11/2011 | Dodge | G06F 16/9535 |
| | | | | 707/822 |
| 2015/0212803 | A1* | 7/2015 | Clifford | G06F 8/4443 |
| | | | | 717/146 |
| 2016/0266882 | A1* | 9/2016 | Trevathan | G06F 8/71 |
| 2018/0203678 | A1* | 7/2018 | Park | G06F 8/41 |
| 2018/0359340 | A1* | 12/2018 | Vincent | G06F 9/547 |
| 2019/0068373 | A1* | 2/2019 | Konduru | H04L 63/0853 |
| 2020/0125732 | A1* | 4/2020 | Iyer | G06F 11/3612 |
| 2020/0167134 | A1* | 5/2020 | Dey | G06F 8/65 |
| 2020/0410759 | A1* | 12/2020 | Murphy-Chutorian | G06T 19/006 |
| 2021/0026757 | A1* | 1/2021 | Rodriguez | G06F 11/3624 |
| 2021/0279115 | A1* | 9/2021 | Aspro | G06F 8/30 |
| 2022/0035689 | A1* | 2/2022 | Raheja | G06F 9/5011 |
| 2022/0383122 | A1* | 12/2022 | Pokorny | G06F 17/16 |
| 2023/0049741 | A1* | 2/2023 | Liu | G06F 8/71 |
| 2023/0087569 | A1* | 3/2023 | Gurvitz | G06F 11/3684 |
| | | | | 717/124 |
| 2024/0311092 | A1* | 9/2024 | Wang | G06F 8/315 |

* cited by examiner

SYSTEM AND METHOD FOR DEVELOPMENT OF GATEWAY POLICIES IN AN APPLICATION PROGRAMMING INTERFACE ENVIRONMENT

CROSS-REFERENCE TO RELATED APPLICATIONS

This application claims the benefit of U.S. Provisional Patent Application No. 63/246,137, filed Sep. 20, 2021, entitled "Enterprise Management Functionality in an Application Programming Interface Gateway," which is incorporated by reference herein in its entirety.

BACKGROUND

Technical Field

One or more implementations relate to the field of Application Programming Interfaces (APIs), and more specifically to a policy development kit for development of gateway policies.

Background Art

As connectivity between mobile devices and other computing platforms continues to develop, applications have been developed that communicate and share information. Commonly, applications may communicate via an Application Programming Interface (API). An API is a software interface offering a service to other programs to communicate data. APIs may have several different components, such as specifications, markdown documents, etc. that constitute part of an API's development. Further, there may be several computing jobs required in order to prepare an API for publishing and to publish the API. Some of these commands can be very expensive and time-consuming operations.

One or more API gateways facilitate communication with the APIs. Specifically, An API gateway is an API management tool that sits between a client and a collection of backend services. The API gateway acts as a reverse proxy to accept all application programming interface (API) calls, aggregate the various services required to fulfill them, and return the appropriate result. Gateways are capable of performing a wide variety of functions, which are defined by policies programmed into those gateways. These policies can be customized by each developer to meet the specific needs of their API environments.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
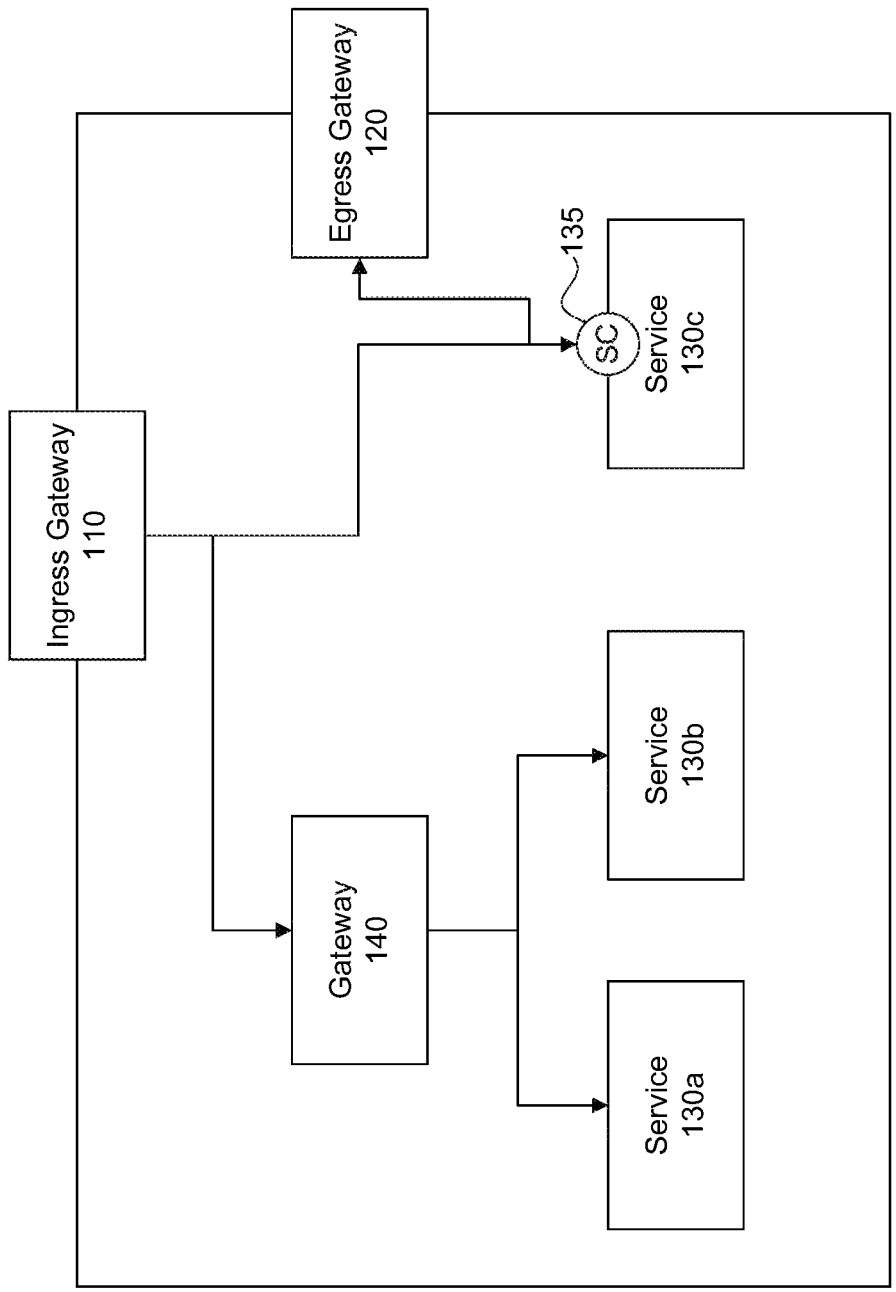
FIG. 1 illustrates a block diagram of an Application Programming Interface (API) environment, according to some embodiments.

Provided herein are system, apparatus, device, method and/or computer program product embodiments, and/or combinations and sub-combinations thereof, for simplifying the development of gateway policies in an API environment.

Currently, when a developer seeks to develop a policy for an API gateway, the developer essentially begins from scratch. The developer codes all necessary aspects of the policy in whichever programming language is being implemented in their API environment. This results in significant duplicative coding, as many APIs will generally share common elements. Specifically, there exists numerous policies coded by different developers, which are universally applicable. Additionally, when migrating from a current API environment to another, oftentimes the programming language employed by the new API environment is different from that of the original API environment. As a result, the policies must be recoded for the new environment. This repetitive coding of policies is extremely inefficient. As such there is a need for a policy development kit that reduces the amount of duplicative coding efforts in order to streamline policy development.

In some embodiments, a policy development kit according to the present disclosure is used. In some embodiments, this is achieved by archiving a plurality of common policy code modules that can be retrieved, called, and/or customized by the developer. A command line interface (CLI) is used in order to code the policies and generate the particular function calls to the pre-stored modules. In embodiments, the CLI is customized to allow the function calls to be implemented.

During the development process, the developer codes the gateway policy using the CLI. Whenever the developer needs to include code corresponding to a common pre-stored module, the developer references the proper module in the coding block, which signals to a backend to insert the proper code module into the policy or to carry out a function call to the corresponding pre-stored code module stored in the backend. In embodiments, the CLI may allow commands for searching the available code modules and/or reviewing the code or a summary of the available code modules to assist with the coding process.

After the developer completes the coding of the policy, the policy development kit provides several additional tools to assist with the finalization and implementation of the policy. In an embodiment, the policy development kit includes a testing subsystem. In an embodiment, the testing subsystem installs the policy on a gateway within the environment. The testing subsystem receives the policy under test and one or more sets of test data from the developer. The testing subsystem runs the sets of test data through the policy and outputs the results of the tests to the developer. The developer can compare the results of those test scenarios with the expected results to determine whether the policy is operating as intended.

Once the policy has been programmed and tested, it is ready for implementation. In an embodiment, the final policy is compiled into a common gateway language regardless of the language the original policy was programmed with. In an embodiment, the policy is compiled into Web Assembly binary (WASM). The policy is then installed within an appropriate gateway for implementation.

Using the tools provided by the policy development kit of the present disclosure, developing policies for implementation on gateways of an API environment is significantly simplified.

FIG. 1 depicts a block diagram of an exemplary Application Programming Interface (API) environment 100, according to some embodiments. As shown in FIG. 1, environment 100 includes a cluster 105 that operates the API services. The cluster 105 includes several gateways connected to various services. As depicted in FIG. 1, each of the services corresponds to an API. Each of the gateways manages the communication to/from different services. For example, the ingress gateway 110 is positioned at the front of the cluster, like a door. All traffic seeking to come into the cluster must pass through the ingress gateway 110. The ingress gateway 110 includes any number of policies applied to the incoming traffic, such a security policy, authentication, etc. In some embodiments, the ingress gateway performs other tasks, such as application routing, rate limiting, request and response handling, etc.

Similarly, the Egress gateway 120 is also included at the outgoing edge of the cluster and applies policies to outgoing traffic. This may include, for example, data retrievals instantiated by one or more of the different services. Gateway 140 functions similarly to gateways 110 and 120, but applies internal policies on one or more services, such as services 130a and 130b.

In some configurations, a service, such as service 130c, may have associated therewith a sidecar (SC) 135. A sidecar is a separate container that runs alongside an application container in a Kubernetes pod—a helper application of sorts. Sidecars are sometimes used to aggregate and format log messages from multiple app instances into a single file. The SC functions similarly to a gateway, but is more specifically focused on the service to which it is assigned. In some embodiments, the sidecar 135 may perform peripheral tasks, such as platform abstraction, proxy to remote services, logging, and configuration, etc.

In the context of this disclosure, the API environment 100 is used by the developer to instantiate the various policies developed using the policy development kit. Once the policies have been developed they are instantiated on the various gateways. Additionally, during development, the policies can be tested on the various gateways prior to implementation.

Figure 2:
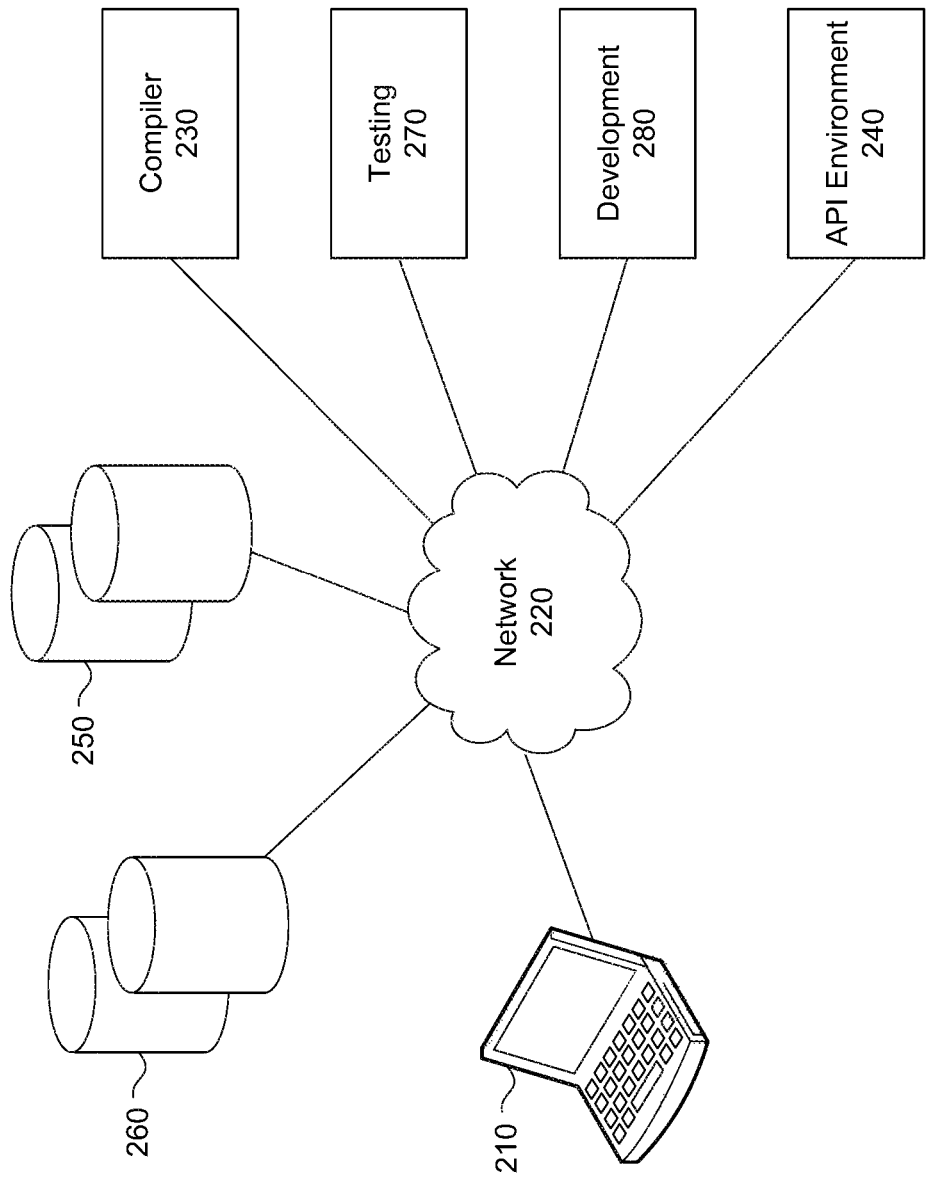
FIG. 2 illustrates a block diagram of an exemplary policy development environment, according to some embodiments.

FIG. 2 illustrates a block diagram an exemplary policy development environment 200 according to embodiments of the present disclosure. As shown in FIG. 2, the policy development environment 200 includes a command line interface (CLI) 210 connected via a network 220 to various development components. For example, via the network 220, the CLI 210 may be in communication with a module database 260, a help file database 250, a compiler 230, a testing subsystem 270, a development server 280, and the API environment 240.

According to embodiments, the CLI 210 is an interface program that accepts text inputs to execute operating system functions. The CLI 210 receives text commands from the user and carries out instructions and function calls through interaction with the development server 280 and others of the development components. The CLI 210 further outputs a command line to the user for receiving the text commands and also outputs text-based messages and command returns to the user. In other words, the CLI 210 provides the interface with the gateway. Users can run commands, and work is does in the background. Through the use of the CLI, code archetypes are created. Additionally, coding examples, help manuals, and other reference materials can be accessed from the CLI 210. Although the CLI has been described as a text-based interface, in an embodiments, the CLI 210 is replaced with a graphical or other interface capable of allowing the user to interface with the backend and generate API policies.

Network 220 is any suitable network over which to exchange data, commands, and access, such as a WLAN, LAN, VPN, PSTN, etc. between the CLI 210, the development server 280, and the other development components. The network 220 provides electrical or wireless communication paths between the various components of the environment 200, using one or more communication protocols, including but not limited to Internet protocol (IP), Session Initiation Protocol (SIP), transmission control protocol (TCP), wireless communication protocols such as 3G, 4G, LTE, etc.

Compiler 230 is provided for compiling coded policies into a uniform implementation language. According to an embodiment, Web Assembly language (WASM) is the language into which policies are compiled. This allows for significant flexibility in the originally-used language. Specifically, different languages from low level to high level can be used, and can all be compiled into Web Assembly binary. As such, the compiler 230 is configured with the capabilities to compile any programming language used by the client into the WASM language. In some embodiments, the compiler 230 is pre-configured to support at least the RUST and GO languages, as these languages are highly popular among API developers and managers. However, in an embodiment the compiler 230 is further configured to allow for additional language support to be added thereon. Thus, if a particular developer codes in an unsupported language, then the compiler 230 can be modified to support their preferred language. Once compiled into the WASM language, the gateway base (e.g., Envoy) executes the compiled WASM.

The API environment 240 represents an embodiment of the API environment 100. The environment 240 includes a live cluster in which various gateways control ingress and egress to various services. The API environment may include any number of active API policies configured to carry out various management functions within the API environment.

In an embodiment, help file database 250 is a repository for help files that will be useful to the developer when operating the development system. Such help files may include lists and operating instructions of predefined function calls and/or code modules, programming language help manuals, error handling, etc. The help files may include one or more of text files, audio files, video files, etc., and may be stored in various database configurations, such as relational or sequence databases, non-relational or non-sequence databases, and may take any number of forms, including but not limited to a centralized database, cloud database, distributed database, object-oriented database, etc. During operation, the user may call or reference various help files from the help file database 250 via the CLI 210.

In an embodiment, module database 260 is a repository of the various pre-configured code modules. As discussed above, a benefit of the policy development kit described herein is to ease user effort by providing pre-coded modules for certain common functions. Such common functions may include, for example, rate limiting, authorization, authentication, IP filtering, etc. These functions are repeatedly used in API development. But it is highly inefficient to require customers to manually code these functions. Therefore, embodiments of the present disclosure include pre-generated code modules for these and other functions that the customer can use with ease. In an embodiment, the code modules are production ready, such that the customer merely needs to call them through a function call or copy and paste their code into a relevant policy. In other embodiments, the code modules are near-production ready, such that they require the customer only to provide certain file or communication paths and/or certain variable definitions.

Testing framework 270 allows customers to quickly and easily test their API policies. Traditionally, in order to test a given policy, a customer would need to manually install the policy on a gateway and likewise manually build a testing logic in order to monitor the results of the policy at the gateway. In an embodiment, the customer codes or otherwise generates a policy as described above, and then simply provides the coded logic to the testing framework 270. The testing framework 270 is configured with predefined test packets. In some embodiments, the test packets differ depending on the type of policy being implemented. Thus, the customer provides the policy to the testing framework along with a testing request. The testing framework 270 implements the policy on an actual or virtual gateway with the predetermined test packets, and reports the results of the test. In embodiments, the testing results may include a spreadsheet of the various test packets and their respective success/failure. In other embodiments, the testing results may indicate a success or failure of the policy and note one or more suspected locations of error in the code.

Development 280 includes one or more coding environments usable by the customer to generate their policies. In embodiments, the development 280 includes one or more playgrounds in which the customer can add, modify, or experiment with different codes. The development 280 may further include a testing gateway to access the testing framework 270 and/or one or more compilers or converters. For example, in embodiments of the present disclosure all coded policies are compiled into the Web Assembly (WASM) format. Because of the wide applicability of WASM, a policy implemented in this fashion can be implemented on a variety of different gateways and/or systems. As a result, the development 280 is configured with several different compilers to compile the code entered by the customer into the WASM format. In an embodiment, the RUST coding language is native to the system, and so the development 280 is preloaded with a compiler to convert the RUST language to WASM. However, other compilers may be available or provided upon request to convert other languages preferred by the customers into the WASM format.

Figure 3:
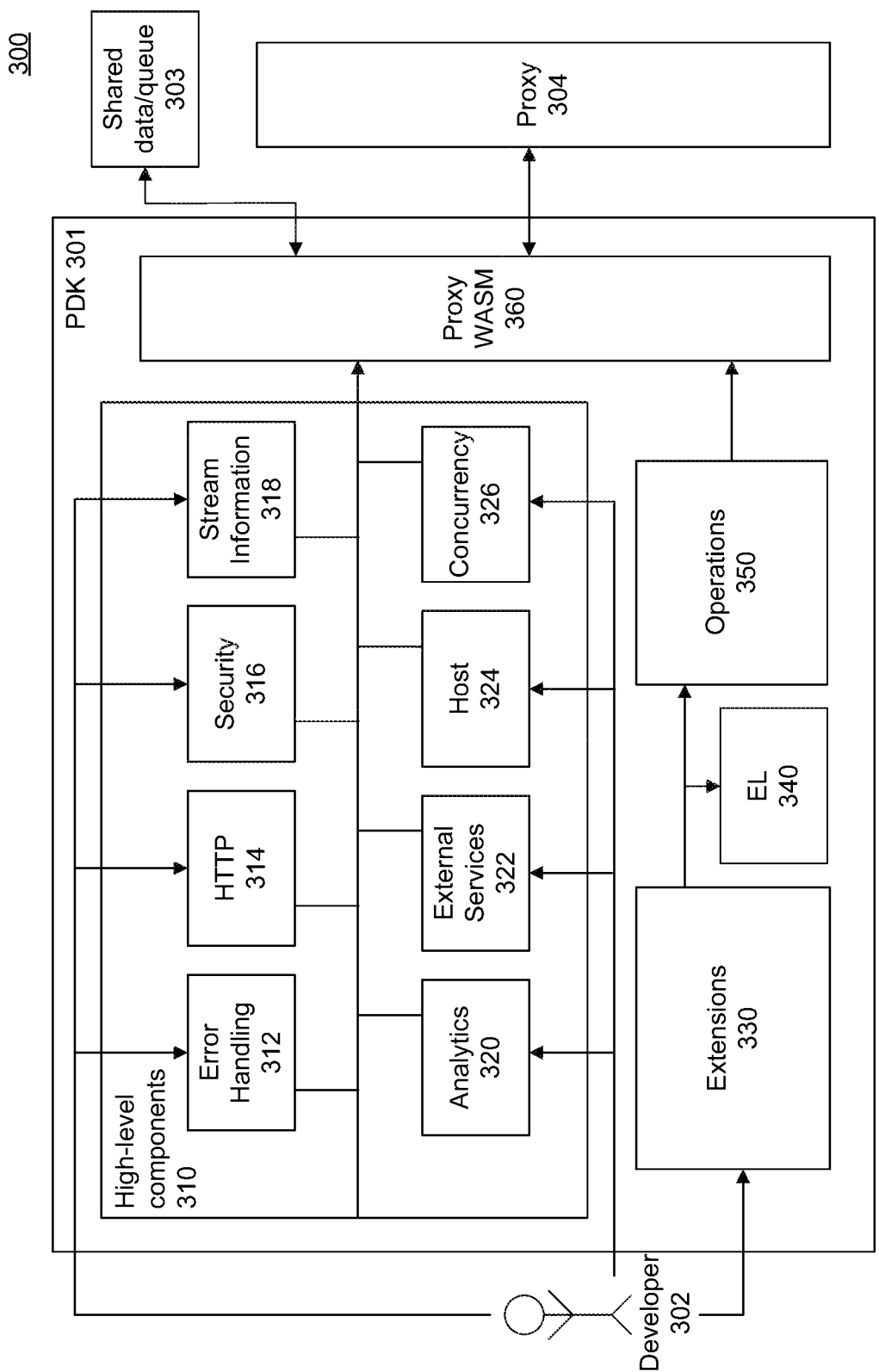
FIG. 3 illustrates a block diagram of an exemplary code policy development kit according to some embodiments.

FIG. 3 illustrates a block diagram of an exemplary policy development kit 300 according to embodiments of the present disclosure. As shown in FIG. 3, the policy development kit (PDK) 300 includes high level components 310, extensions 330, extension language executor 340, Ops 350, and a WASM proxy 360. Connected to the PDK 301 is shared data and shared queue 303 and proxy 304.

In embodiments, the high-level components 310 include error handling 312, HTTP 314, security 316, stream information 318, analytics 320, external services 322, host 324, and concurrency 326. In an embodiment, error handling 312 provides standardized logging for policy errors. Specifically, when an error in a policy is detected, the error is provided to the error handling 318, which logs the error and notifies the customer accordingly.

In an embodiment, HTTP 314 includes a client and response builder. The client includes a simply to use HTTP client that makes an abstraction over the complex logic of handling requests and responses to third party services through the proxy WASM 360. Meanwhile, the HTTP response builder includes an abstraction layer that allows developers to easily construct valid HTTP responses to be sent to the customer.

In an embodiment, security 316 includes an authentication object and an encryption function configured to carry out user authentication and data encryption. In an embodiment, the authentication object provides the customer the ability to easily, and encryption provides the functionality to allow the user to easily encrypt and/or hash configuration data or in-flight. In an embodiment, stream information 318 includes properties and policy violations, and is configured to detect policy violations at the security 316. In particular, the policy violations includes a mechanism for the user to report that a certain policy has an error or has made a violation. This data will be pushed to the platform, such as Anypoint Platform when using a gateway, such as a Flex gateway.

In an embodiments, analytics 320 includes functionality for collecting and sending policy metrics. Such metrics may indicate the performance of certain policies, the usage of certain policies, among other statistics. In an embodiment, external services 322 includes an HTTP client, a callback HTTP client, and an object store HTTP client. In embodiments, host 324 includes a time function and stores statistics relating to the implemented policies. In an embodiment, concurrency 326 handles concurrency over the proxy shared data. In particular, concurrency 326 abstracts the user from doing optimistic locking when accessing the proxy's shared data.

The high level components 310 are accessible by a developer 302 in order to generate, implement, and review relevant policies within the API environment.

In an embodiments, extensions 330 are also provided. The extensions 330 provide policy extensions to allow the user to generate custom expressions for data accessing and other functions. In embodiments, the extensions 330 may include a bootstrapper, an HTTP filter, a factory, and a configurable factory. In an embodiment, an expression language interpreter 340 is provided between the extensions and the Ops 350. The EL interpreter 340 is configured to handle custom expressions for data accessing.

In an embodiment, Ops 350 include the various operations needed to prepare the extensions for the proxy WASM 360. In embodiments, these operations include RequestHeaderOps, RequestBodyOps, ResponseHeaderOps, ResponseBodyOps, ExchangeCompleteOps, and ConfigureOps. These various operations provide the functionality to generate request headers and bodies, read response headers and bodies, identify exchange completion and perform configuration.

The high-level components 310 and the extensions 330 communicate with the proxy WASM 360. A proxy is a software element that connects to back-end services, then creates a more modern and useful API to connect to the front end. In this embodiment, the proxy 360 is built on the Web Assembly (WASM) language to enhance usability across different platforms. The proxy WASM 360 is connected with the shared data/shared queue 303 and a main proxy 304. In this manner, the main proxy 304 may refer back to the proxy WASM, which may receive its instructions, etc. from the high-level components 310 and extensions 330 in order to effectuate implementation of API policies within the API environment.

Figure 4:
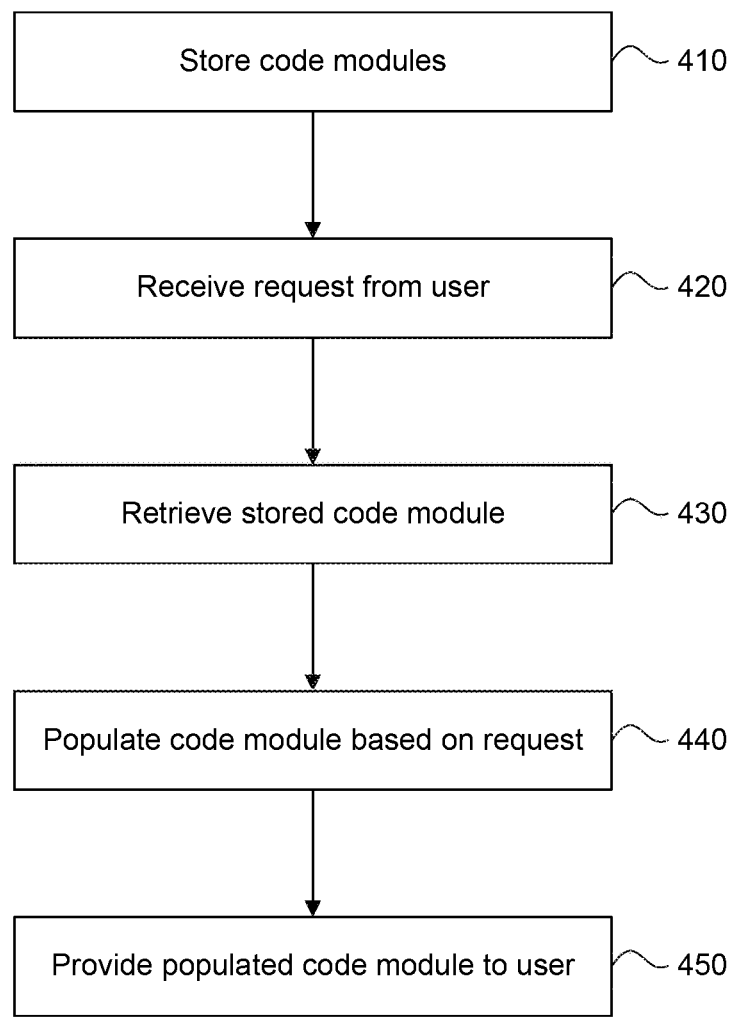
FIG. 4 illustrates a flowchart diagram of an exemplary method for developing policies according to some embodiments.

FIG. 4 illustrates a flowchart diagram of an exemplary method 400 for developing policies. The method begins at step 410, where the system stores predefined code modules. In embodiments, these code modules are stored in a data repository, such as a module database. The code modules are pre-coded modules corresponding to common API policy functions, and may include without limitation authentication, rate limiting, authorization, parsing, etc. In some embodiments, the code modules are stored in a production-ready format with all variables predefined. In other embodiments, the code modules are in a shell format, with certain customizations required before they can go to production. In an example, the code modules lack certain variable definitions, file paths, etc.

In step 420, the system receives a request from the user for a particular code module. In an embodiment, the request can come from a command line interface in a form such as a GET command, or a REQUEST command. In other embodiments, the request can be provided implicitly, such as by the entry of a function call corresponding to the code module into a coding program, such as a playground.

In step 430, the system retrieves the stored code module. In embodiments, the system parses the request in order to determine the specific code module being requested. In an example, the code module is identified in the request by a name, filepath, or other identifier. Once the specific code module has been identified, the system retrieves the requested code module from storage.

In step 440, the system populates the module based on the request. In embodiments, the request may include one or more variables or parameters that are defined by the user. When parsing the request, the system also parses these variables/parameters in order to populate the code module according to the user specifications. For example, the request may include, in addition to the module identifier, a pathname that identifies a backend server for which the policy will be applicable, or may include variable values used to customize the code module for the specific implementations required by the customer. Using this information, the system customizes the code module accordingly. For example, pathnames and variables are incorporated into the appropriate locations in the code module to produce a production-ready module.

Once the code module has been populated according to the user's specifications, the code module is provided to the user in step 450.

Figure 5:
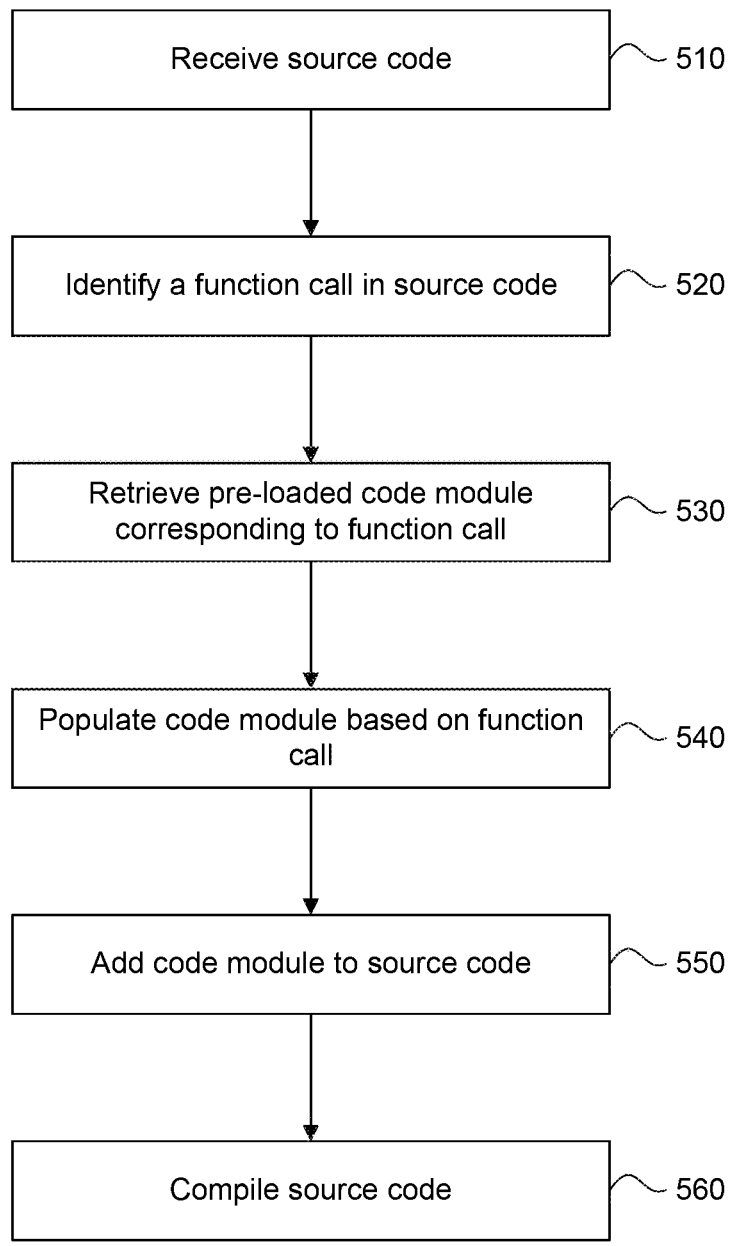
FIG. 5 illustrates a flowchart diagram of an exemplary method for compiling abbreviated source code according to an exemplary embodiment.

FIG. 5 illustrates a flowchart diagram of an exemplary method for compiling abbreviated source code according to an exemplary embodiment. The method begins at step 510 with the system receiving source code from the user. In embodiments, the source code is developed within the system by the user using one of the various tools provided to them. Such tools may include a coding playground, coding environment, help files, command line interface, etc. Using these tools, the user generates abbreviated code that includes calls or references to predefined code modules. In embodiments, specific call formats for identifying these code modules is provided to the user in the various help files. When generating their source code, the user includes function calls or other references that can be identified by the system for locating and incorporated predefined code modules.

In step 520, the system reviews the received source code in order to identify a function call or other reference to a predefined code module. As discussed above, there may be a variety of different formats by which the user can properly identify a predefined code module, and that identification can include any number of customizations as allowed by the reference definitions defined by the system. Therefore, provided that the reference adheres to the standards set forth in the system, the system will be able to properly identify the intended code response from a review of the user's source code.

In step 530, the system retrieves the predefined code module from storage based on the identified code module in step 520. In embodiments, many different predefined code modules may be available to the user corresponding to more common policy functions that are often used. Such code modules may include security, rate-limiting, transformation, mediation, authentication, authorization, etc., among others. The system retrieves the code module corresponding to the reference included within the user's source code.

In step 540, the system populates the code module based on the function call or other reference. To provide an example, such a function call may be stated in the code as "pRateLmt (pathname, variable x=10000, variable y=1);" In this example, the reference identifies the rate limiting code module with the name "pRateLmt", provides a pathname of the server to which the policy will be applied, and defines two variables. The x variable may be defined by the system as the number of access grants within a given period of time, whereas the variable y may define the time period. Thus, the user has set a rate limit of 10000 access grants per second to the server located at "pathname." Using the information provided by the user, the system populates the code module according to their specifications. To continue the above example, the system loads the pathname, as well as the defined variables into their relevant locations in the code module. Additionally, there may be other variables not specifically defined by the user. In this event, those variables are given default values. In an embodiment, the default values are also defined in the help files.

In step 550, the populated code module is added to the user's source code. In an embodiment, this occurs during compiling and is invisible to the user. In other embodiments, the populated code module is placed within the source code in place of the reference. In step 560, the source code with the populated code module (and all other code modules) is compiled for production. As discussed above, in an embodiment, the source code is compiled into WASM for production.

Figure 6:
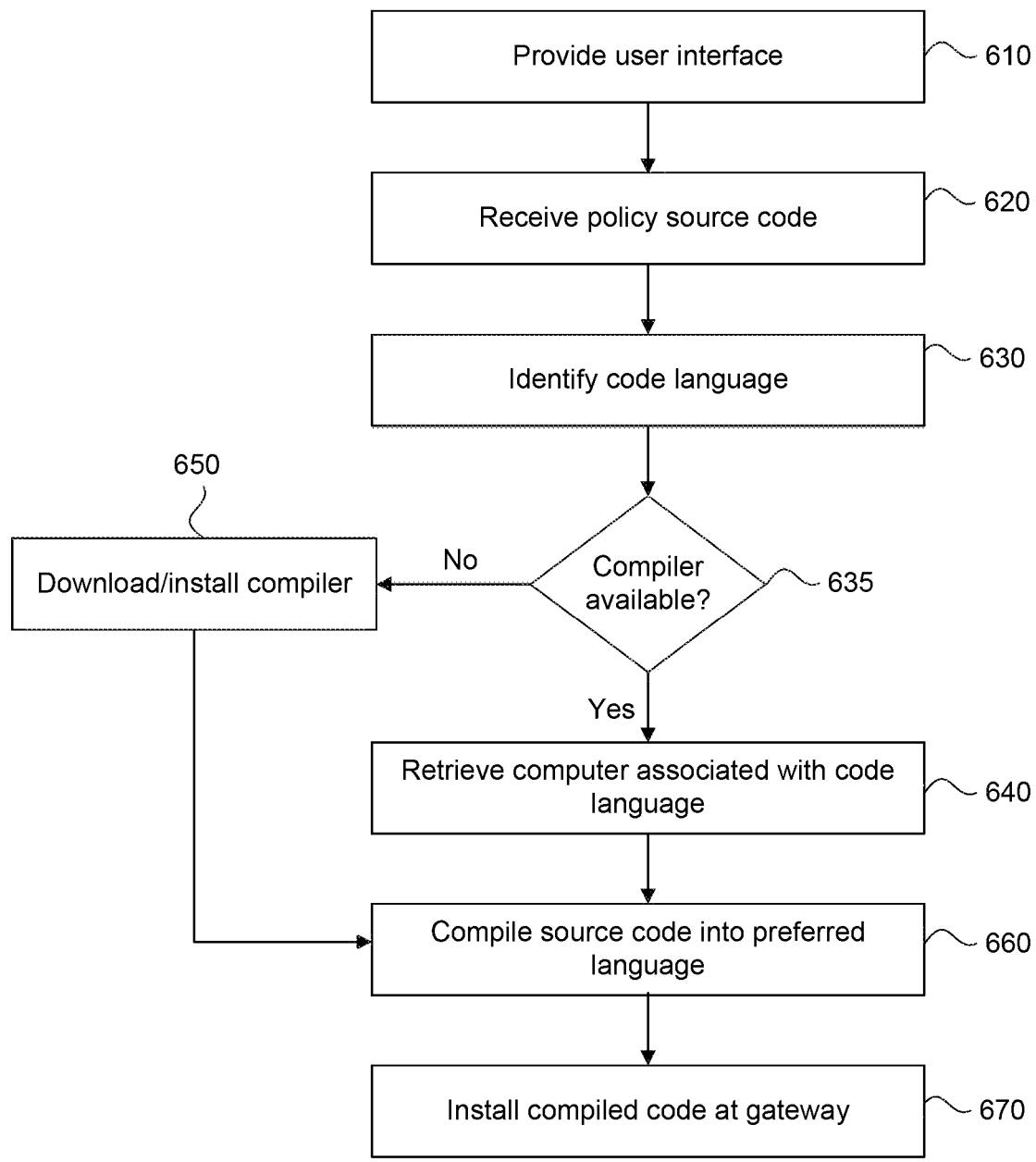
FIG. 6 illustrates a flowchart diagram of an exemplary method for compiling source code according to an exemplary embodiment.

FIG. 6 illustrates a flowchart diagram of an exemplary method 600 for compiling source code according to an embodiment. The method begins at step 610 with the system providing the user with a user interface by which the user can generate and/or submit source code. In embodiments, the interface is a command line interface capable of receiving and processing text inputs. In other embodiments, the interface is a graphical user interface.

In step 620, the system receives source code from the user. In an embodiment, the source code relates to a policy to be implemented at a gateway within the API environment. In an embodiment, the source code is provided in a default programming language native to the development environment, such as RUST. However, in embodiments, the user is permitted to code policies in a programming language of their choice.

In step 630, programming language of the source code is identified. There may be a variety of different ways to identify the specific type of source code being used, as each source code has its own syntax, formatting, and other flags. Therefore, the provided code is reviewed for these identifiers and a determination is made as to the specific programming language being used. In embodiments, machine learning can be used to identify the programming language, trained based on earlier analyses and identifications. In other embodiments, the specific programming language being used can be specified by the user.

In step 635, a determination is made as to whether a compiler for the identified programming language is available. Specifically, whereas a RUST compiler may be preloaded with the system when RUST is used as a default coding language. Meanwhile, if the user chooses to use a different programming language, a compiler may be needed to compile the desired programming language into WASM.

If a compiler for the desired programming language is not available (635—No), then the method proceeds to step 650. In step 650, the system seeks out and downloads/installs a compiler corresponding to the desired programming language. In some instances, a custom compiler may be needed in order to compile the user's preferred code into the WASM language. In some embodiments, compilers may be provided to compile the source code into a language other than WASM.

If, on the other hand, a compiler is available for the programming language, the compiler is retrieved from memory in step 640. In some embodiments, the compiler is not retrieved, but rather the code is merely provided to the compiler. Once the appropriate compiler has been made available, the source code is compiled in step 660. In an embodiment, the code is compiled into WASM. Provided that the source code successfully compiles in step 660, the compiled code is installed at a gateway or other API node in step 670.

The descriptions of the above methods is exemplary, and can be modified in manners described herein. Additionally, the orders of the steps described with respect to the above methods is for illustration only, and can be rearranged in any logical order. Further, the methods may include more or fewer steps than those described above. These and other aspects of the above methods will be apparent to those having ordinary skill in the art.

Figure 7:
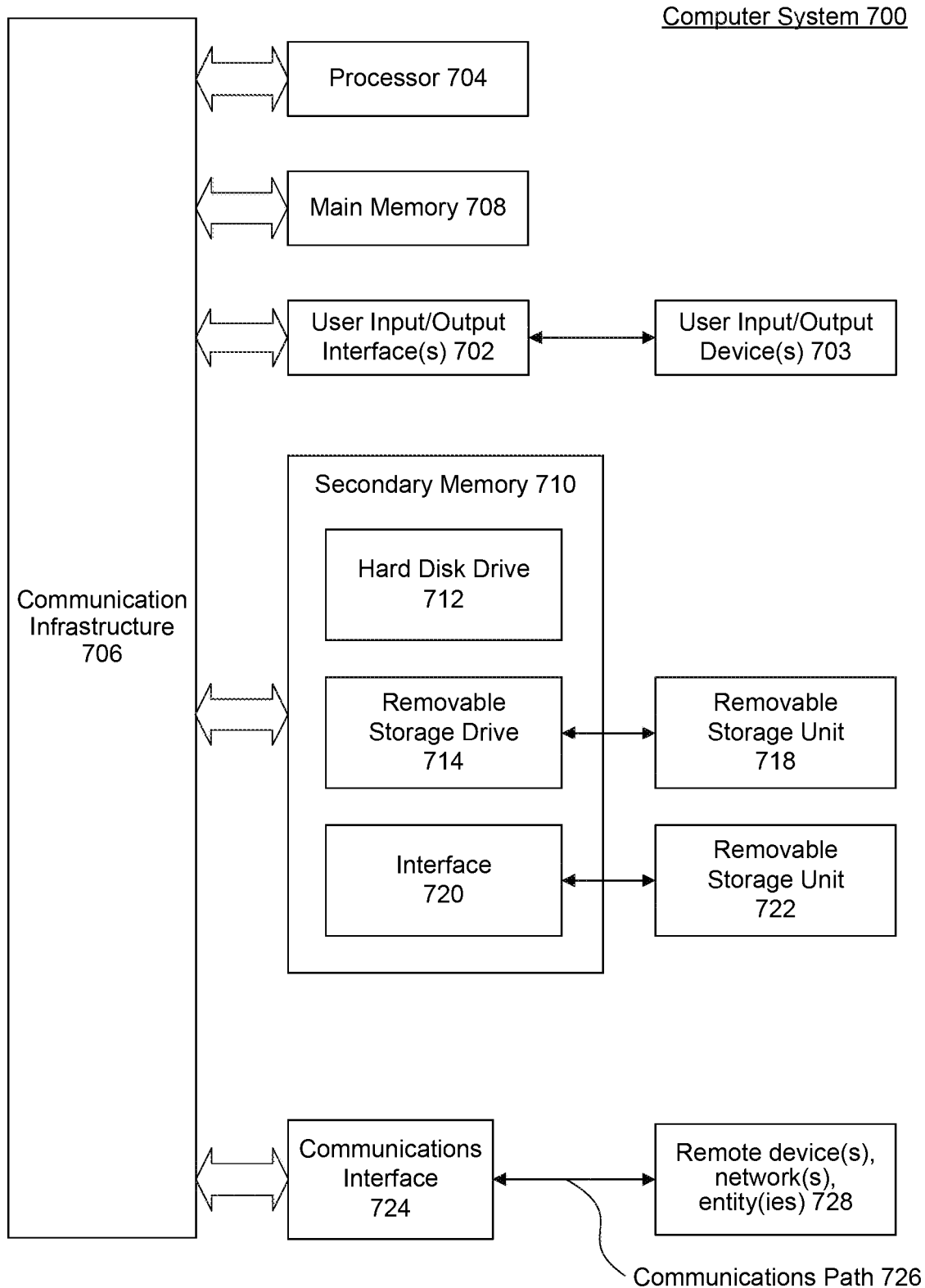
FIG. 7 depicts an example computer system useful for implementing various embodiments.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A system for policy development within an API environment, comprising:
   a memory; and
   one or more processors configured to perform operations stored in the memory, the operations comprising:
      analyzing source code, received via a user interface, to identify a reference to one of a plurality of pre-stored code modules configured to execute a respective common function within the API environment, the pre-stored code modules being stored in a shell format and having one or more variables and/or pathnames left blank and available for customization;
      retrieving the one of the plurality of pre-stored code modules from the memory based on the reference;
      customizing the retrieved one of the plurality of pre-stored code modules based on information included in the identified reference;
      populating the source code with the customized one of the plurality of pre-stored code modules; and
      compiling the populated source code including the customized one of the plurality of pre-stored code modules.

2. The system of claim 1, wherein the operations further comprise populating the customized one of the plurality of pre-stored code modules based on information provided with the reference.

3. The system of claim 2, wherein the reference includes a plurality of definitions.

4. The system of claim 3, wherein the plurality of definitions define at least one of the one or more variables and/or pathnames.

5. The system of claim 4, wherein the pathname defines a location of a backend server.

6. The system of claim 4, wherein the variable defines an operating parameter of the code module.

7. The system of claim 4, wherein the populating includes modifying the one of the plurality of pre-stored code modules to include the pathname and the variable.

8. A method for developing a policy within an API environment, comprising:
   storing a plurality of code modules, the plurality of code modules configured to execute a respective common function within the API environment;
   analyzing source code to identify a reference to one of the plurality of stored code modules received via a user interface, the plurality of stored code modules being stored in a shell format and having one or more variables and/or pathnames left blank and available for customization;

retrieving the one of the plurality of stored code modules from a memory based on the reference;

customizing the retrieved one of the plurality of stored code modules based on information included in the identified reference;

populating the source code with the customized one of the plurality of code modules; and compiling the populated source code includes the customized one of the plurality of code modules.

9. The method of claim 8, further comprising populating the customized one of the plurality of code modules based on information provided with the reference.

10. The method of claim 9, wherein the reference includes a plurality of definitions.

11. The method of claim 10, wherein the plurality of definitions define at least one of the one or more variables and/or pathnames.

12. The method of claim 11, wherein the pathname defines a location of a backend server.

13. The method of claim 11, wherein the variable defines an operating parameter of the code module.

14. The method of claim 11, wherein the populating includes modifying the one of the plurality of code modules to include the pathname and the variable.

15. An API development system, comprising:
a memory; and
one or more processors configured to perform operations stored in the memory, the operations comprising:
analyzing source code to identify a reference to one of a plurality of stored code modules received via a user interface, the plurality of stored code modules being stored in a shell format and having one or more variables and/or pathnames left blank and available for customization, the reference being formatted according to a predefined format;

modifying the source code to include the referenced one of the plurality of stored code modules, the predefined code module being customized based on information included in the identified reference;

identifying a programming language associated with the source code;

selecting a compiler based on the programming language; and compiling the modified source code including the customized predefined code module using the selected compiler.

16. The API development system of claim 15, wherein the operations further comprise:
determining that a compiler for the programming language is not available; and
in response to the determining, downloading and installing the compiler for the programming language.

17. The API development system of claim 16, wherein the compiler is for compiling the source code in the programming language to a predetermined executable format.

18. The API development system of claim 17, wherein the predetermined executable format is Web Assembly.

19. The API development system of claim 15, wherein the code module includes one of an authentication, rate limiting, or parsing function.

20. The API development system of claim 15, wherein the compiling includes adding the code module to the source code.

* * * * *